United States Patent [19]

Lee et al.

[11] Patent Number: 5,995,969
[45] Date of Patent: Nov. 30, 1999

[54] INTEGRATED CASE REPOSITORY META MODEL SYSTEM FOR PROCESS METHODOLOGY AND INTEGRATED SUPPORTING METHOD

[75] Inventors: Heon Ki Lee; Gyu Sang Shin, both of Daejeon, Rep. of Korea

[73] Assignee: Electronics and Telecommunications Research Institute, Daejeon, Rep. of Korea

[21] Appl. No.: 09/002,386

[22] Filed: Jan. 2, 1998

[30] Foreign Application Priority Data

Oct. 21, 1997 [KR] Rep. of Korea ..................... 97-53970

[51] Int. Cl.$^6$ .................................................. G06F 17/30
[52] U.S. Cl. .................................. 707/100; 707/3; 707/4; 707/102; 395/701
[58] Field of Search .................................. 707/3, 4, 102, 707/100; 395/701

[56] References Cited

U.S. PATENT DOCUMENTS

| 5,019,961 | 5/1991 | Addesso et al. | 364/192 |
|---|---|---|---|
| 5,249,300 | 9/1993 | Bachman et al. | 707/104 |
| 5,295,222 | 3/1994 | Wadwa et al. | 395/703 |
| 5,428,729 | 6/1995 | Chang et al. | 345/331 |
| 5,535,325 | 7/1996 | Cattell et al. | 707/102 |
| 5,550,971 | 8/1996 | Brunner et al. | 707/3 |
| 5,748,973 | 5/1998 | Palmer et al. | 704/9 |
| 5,802,514 | 9/1998 | Huber | 707/4 |
| 5,867,596 | 2/1999 | Kano et al. | 382/203 |

OTHER PUBLICATIONS

Alderson et al., "On scope of the relationships", Proceedings Eight IEEE International Workshop on Software Technology and Engineering Practice incorporating Computer Aided Software Engineering, abstract Only, Jul. 1997.

Kim et al., "Form: a flexible data model for integrated CASE environments", Data & Knowledge Engineering, vol.22, No.2, abstract only, Apr. 1997.

Venable et al., "Integrating and supporting entity relationship and object role models", OOER '95; Object–oriented and Entity–Relationship Modeling. 14th International Conference Proceedings, abstract Only, Dec. 1995.

Ryman, A., "Constructing software design theories and models", Studies of Software Design. ICSE '93 Workworp, abstract only, May 1993.

Tangorra, F., "A methodology for reverse engineering hierarchical databases", Information and Software Technology, vol.37, No.4, abstract only, Apr. 1995.

(List continued on next page.)

*Primary Examiner*—Jean R. Homere
*Attorney, Agent, or Firm*—Antonelli, Terry, Stout & Kraus, LLP

[57] ABSTRACT

The present invention provides a meta model system of information resource dictionary system (IRDS) of an integrated computer aided software engineering (CASE) repository, which consistently stores and shares information generated by CASE tools of data flow diagram (DFD) and structure chart (SC) as well as supports software life cycle, and integrated supporting method for the integrated CASE repository meta model system. The repository is constructed to commonly stores, shares and manages information generated by CASE tools, realizing standardization and full automation of software development process methodology, and sharing of information between the tools. Integrated CASE meta model includes rules and constraints for information, which each tool must have, performs consistency detection for the type and meaning of information generated when the information is stored in the CASE repository, and is composed of meta model of repository which becomes a storage structure for all information generated by each tool. The meta model of repository determines which software life cycle and methodology do CASE tools based on the repository support. Accordingly, the information storage automatically integratedly manages information.

6 Claims, 8 Drawing Sheets

OTHER PUBLICATIONS

Chudziak, J., et al. "SDM–CASE: a verification and validation tool for semantic database schemata", Proceedings Decision Sciences Institute, abstract only, Sep. 1994.

Breiteneder et al., "Graph rewriting system systems for the entity–relationship approach", Data & knowledge Engineering, vol.17, No.3, abstract only, Dec. 1995.

Conradi, R., et al. "Customization and evolution of process models in EPOS", IFIP Transaction A: Computer Science and Technology, n A–30, abstract only, Sep. 1993.

Budiardjo, et al. "A custodial application generator for use in a CASE tool environment", Proceedings of the Sixth International Workshop on Computer–Aided Software Engineering, abstract only, Jul. 1993.

Brinkkekemper, et al., "Integrating diagrams in CASE tools through modelling transparencey", Information and Software Technology, vol.35, No.2, abstract only, Feb. 1993.

Siau, et al., "A CASE tool for conceptual database desing", Information and Software Technology, vol.34, No. 12, abstract only, Dec. 1992.

Austin, et al., "An entity–relationship modelling approach to IDEF/sub", Proceedings of the IEEE 1990 National Aerospace and Electronics Conference, vol.2 of 3, abstract only, May 1990.

"The Role of Meta Models in Federating System Modelling Techniques", by P. Steele, pp. 315–326.

FIG.6

(a) | META ENTITY ID | ENTITY TYPE FOR META ENTITY | ATTRIBUTE GROUP TYPE FOR META ENTITY | ATTRIBUTE TYPE FOR META ENTITY |

(b) | META ENTITY ID | RELATIONSHIP TYPE FOR META ENTITY | ATTRIBUTE TYPE FOR META ENTITY |

(c) | META ENTITY ID | ATTRIBUTE TYPE FOR META ENTITY | FORMAT | LENGTH |
| | | | MINIMUM | MAXIMUM |

(d) | META ENTITY ID | ATTRIBUTE TYPE FOR META ENTITY | ATTRIBUTE TYPE FOR META ENTITY-1 | ATTRIBUTE TYPE FOR META ENTITY-2 |

FIG. 7

| TABLE-NAME | ATTRIBUTE |
|---|---|
| ENTITY-TYPE-ATTRIBUTE-TYPE | ENTITY_TYPE, ENTITY_NAME, AUTHOR_NAME, START_DATE, DESCRIPTION, NUMBER, CONTEXT, KEY_TYPE, DATA-VALUE_TYPE, DATA_LENGTH |
| ENTITY-TYPE-ATTRIBUTE-GROUP-TYPE | ENTITY_NAME. MIN_VALUE, MAX_VALUE |
| RELATIONSHIP-TYPE-ATTRIBUTE-TYPE | RELATIONSHIP_TYPE, ENTITY1, ENTITY2, OBJECT_X, OBJECT_Y, DIAGRAM_NAME, SOURCE_OBJECT_X, SOURCE_OBJECT_Y, SINK_OBJECT_X, SINK_OBJECT_Y, OBJECT_COLOR, ACCESS_TYPE, TEXT_X, TEXT_Y, TEXT_1, TEXT_2, TEXT_3, BEND_1X, BEND_1Y, BEND_2X, BEND_2Y, BEND_3X, BEND_3Y, BEND_4X, BEND_4Y, BEND_5X, BEND_5Y, BEND_6X, BEND_6Y, BEND_7X, BEND_7Y, BEND_8X, BEND_8Y, CALL_TYPE_1, DU_DATA_TYPE_1, DU_DATA_1X, DU_DATA_1Y, DU_TEXT_1X, DU_TEXT_1Y, DU_TEXT_1, DU_DATA_TYPE_2, DU_DATA_2X, DU_DATA_2Y, DU_TEXT_2X, DU_TEXT_2Y, DU_TEXT_2, DU_DATA_TYPE_3, DU_DATA_3X, DU_DATA_3Y, DU_TEXT_3X, DU_TEXT_3Y, DU_TEXT_3, DU_DATA_TYPE_4, DU_DATA_4X, DU_DATA_4Y, DU_TEXT_4X, DU_TEXT_4Y, DU_TEXT_4, DU_DATA_TYPE_5, DU_DATA_5X, DU_DATA_5Y, DU_TEXT_5X, DU_TEXT_5Y, DU_TEXT_5, DU_DATA_TYPE_6, DU_DATA_6X, DU_DATA_6Y, DU_TEXT_6X, DU_TEXT_6Y, DU_TEXT_6 |

INTEGRATED CASE REPOSITORY META MODEL SYSTEM FOR PROCESS METHODOLOGY AND INTEGRATED SUPPORTING METHOD

BACKGROUND OF THE INVENTION

1. Field of the Invention

The present invention relates to a meta model system for an integrated computer aided software engineering (CASE) repository based on process methodology of structured techniques using information resource dictionary system (IRDS), which consistently stores and shares information generated by CASE tools of data flow diagram (DFD) and structure chart (SC) as well as supports software life cycle, and integrated supporting method for the integrated CASE repository meta model system.

2. Discussion of Related Art

CASE, having two fundamental notions of computer-aided and software engineering, is a tool for developing high-quality software with the aid of automated function of computers within a given time and budget in software development and maintenance. DFD CASE is a tool for supporting a structured analysis technique which is most widely used as software development analyzing technique. DFD is a tool in graphical form, representing the entire structure of a system as components of process, data flow, data store, external entity and process specification.

SC CASE, a tool for supporting a structured design technique in implementation of systems, is a technique in design phase. SC is a tool in graphical form, representing the entire structure of a system as components of root module, standard module, library module, transaction module, database, connector, call, data couple, control flag and module specification.

IRDS, American National Standard Institute (ANSI) standard uniquely approved, is a repository developed by National Institute of Standard and Technology (NIST) of U.S. IRDS defines the contents of repository, repository common interface and user interface. IRDS is characterized by centralized repository which shares and manages information using meta models and meta data in various levels, focused on management of integrated repository. As shown in FIG. 2, IRDS data structure is divided into four data levels 201, 202, 203 and 204 according to the service provided by IRDS and level of abstraction of information stored in IRDS. Three level pairs 201 and 202, 202 and 203, and 203 and 204, which connect the four levels, have the associations of type and instance. Information described in an upper level describes and potentially controls information to be described in a lower level. This standard does not handle integration of CASE tools but can help the integration of CASE tools for analysis and design.

CASE tools, generally, are used at each phase in software development process, replacing manual operation, to perform related operations with speediness and reliability. CASE tools also use various kinds of information or newly create information during the operation. Supporting tools of Integrated Software Engineering Tool (ISET), CASE Toolkit tool developed by systems engineering research institute in 1994, are composed of data interfaces 104 and 105, and databases 106 and 108, different from each other, for the purpose of storing and controlling newly created information. Also, each of the supporting tools manages the database according to its own database interface. Thus, to use products generated in former stage of START 102 at the next stage of STADE 103, a translator 107 of separate translation algorithm, is required.

Accordingly, when STADE requires some information of START, the operation procedure is complicated and data consistency is difficult to maintain, due to the difference in data storage structures of them. Furthermore, information created by the supporting tools cannot be shared so that repeated information and inconsistent information cannot be controlled previously. Moreover, in case of repeated creation of information, unnecessary time and cost are consumed for the development operation. This results in difficulties in standardization and automation of software development process, and unnecessary repetition of storage and management for identical information. Also, it requires translation algorithm 107 between the supporting tools, and variety of database interfaces 104 and 105, and data structures 106 and 108.

The above problems need complementing of ISET, based on an information storage which can integrate, store, manage and share information generated by various kinds of tools. Accordingly, meta models of repository are required for effectively supporting storage, sharing and management of information created by CASE tools supporting software life cycle. The meta models define the kind of information to be stored in the repository, the type and nature of information, rules and constraints about information, and determine software life cycle and methodology which are supported by CASE tools, based on the repository. Accordingly, the repository automatically integratedly manages information, to provide standardization and full automation of software development process, and sharing of information between tools.

SUMMARY OF THE INVENTION

Accordingly, the present invention is directed to a meta model system of an integrated CASE repository for process methodology and integrated supporting method in that substantially obviates one or more of the problems due to limitations and disadvantages of the related art.

An object of the present invention is to provide a meta model system of an integrated CASE repository and integrated supporting method, which constructs a repository for commonly storing, sharing and managing information generated by CASE tools of DFD and SC of process methodologies, to realize standardization and full automation of software development process and sharing of information between tools.

Integrated CASE tools for process methodology should include a variety of tools such as DFD tool, SC tool, repository searcher and repository generator. The repository is an essential component for consistently storing, sharing and managing information generated by DFD and SC tools of diagraming tools. The repository automatically integratedly manages information of analysis and design for structured techniques supporting the software development process, to provide standardization and full automation of the software development process and sharing of information between the tools.

In the present invention, to design the repository of the integrated CASE tools for processes, integrated CASE meta models for process methodology, meta models of the repository, are represented as conceptual model of entity-relationship model (ER models). ER modeling, a conceptual design technique of database proposed by P. P. Chen, represents definition for data and mutual relationship between data in plane to a user, irrespective of hardwares or data storing method of database management system (DBMS). ER model representing the meta model of the repository, having a form of concept added or restricted to conventional techniques proposed, is used for defining the contents of IRD schema 202 and IRD 203 of FIG. 2, based on modeling techniques containing unary and binary relationships having directional associations, attributes related with entities or relationships, and characteristic of single level of attribute groups related to entities.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 6A to 6D show logical data structures storing information of meta entities of FIG. 5;

FIG. 7 shows a logical data structure which storing information of meta data of FIGS. 6A to 6D.

DETAILED DESCRIPTION OF PREFERRED EMBODIMENT

Reference will now be made in detail to the preferred embodiments of the present invention, examples of which are illustrated in the accompanying drawings.

Figure 1:
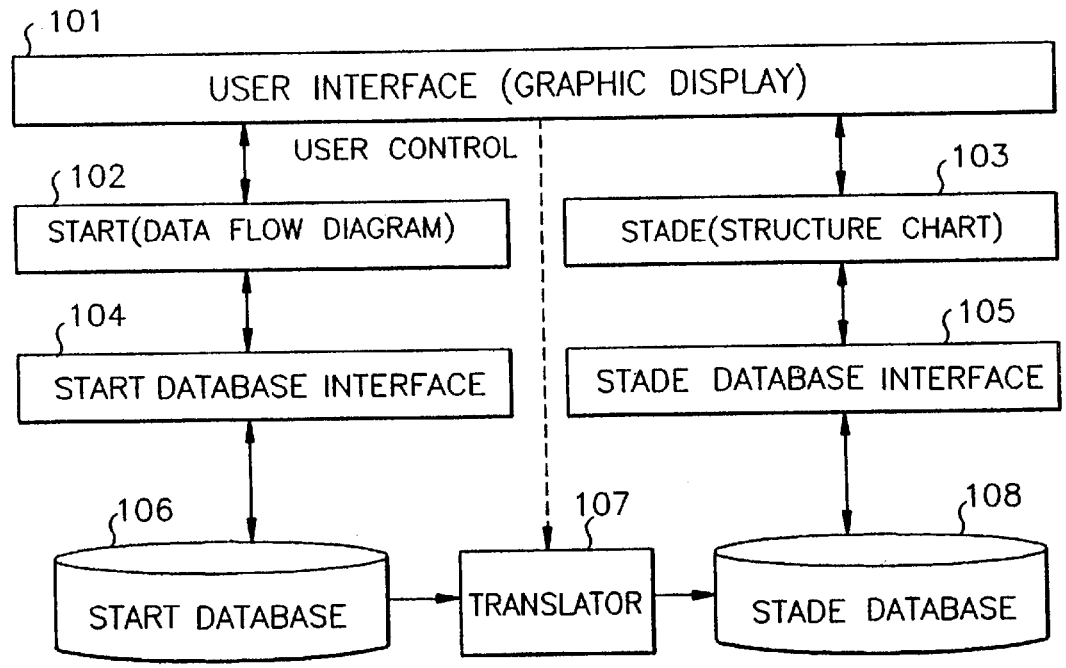
FIG. 1 shows a architecture of ISET system of a conventional CASE toolkit tool.
Figure 2:
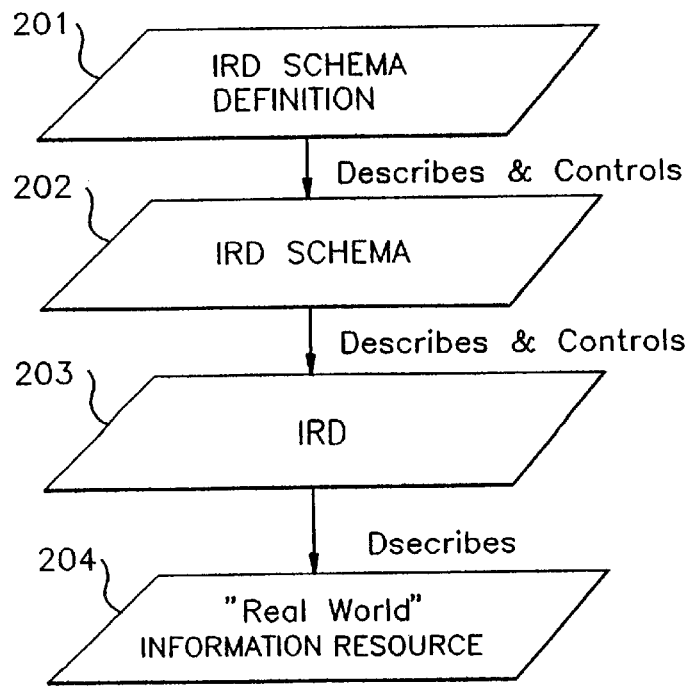
FIG. 2 shows a structure of four level architecture of IRDS.
Figure 3:
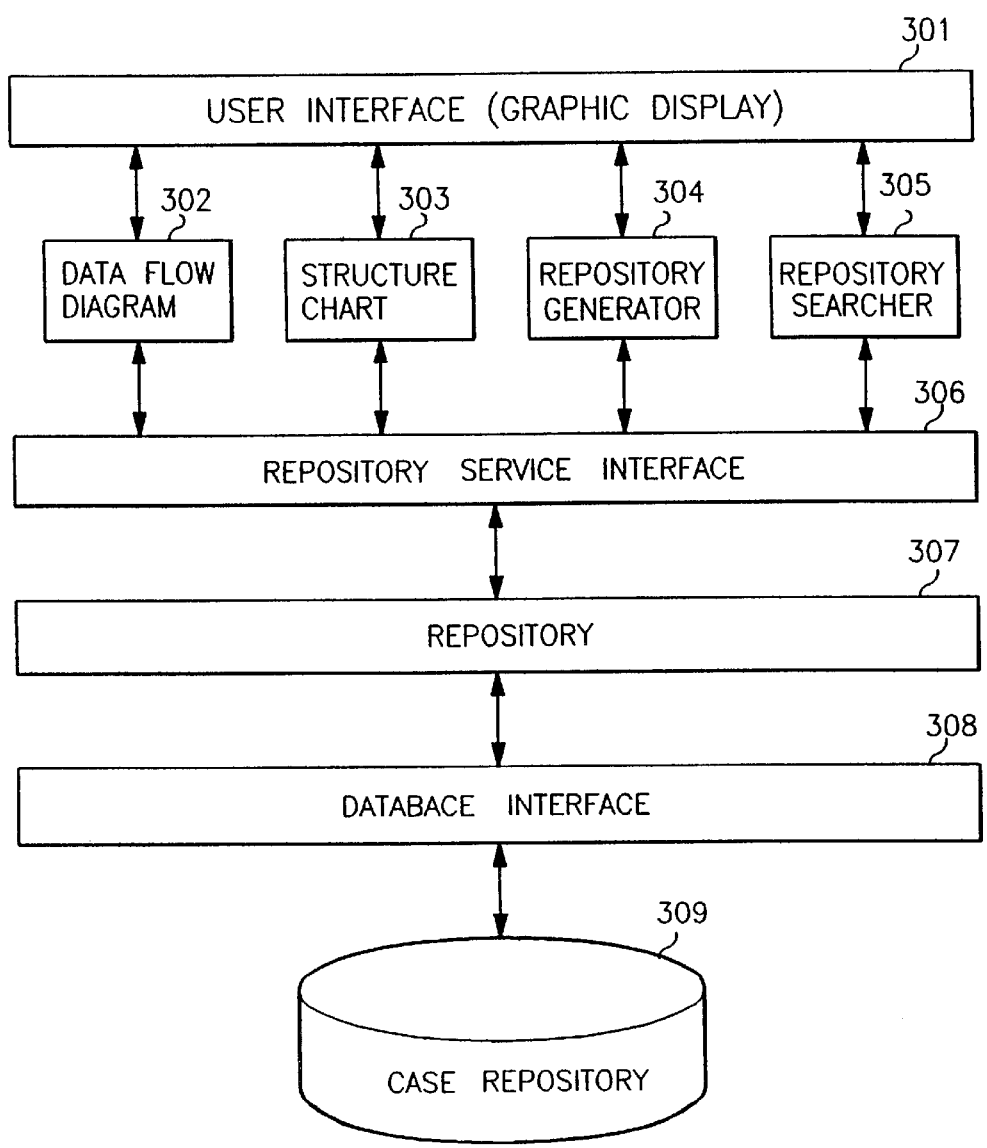
FIG. 3 shows a architecture of a system of a repository of an integrated CASE tool according to the present invention.

FIG. 3 shows a architecture of a system which is a repository of an integrated CASE tool according to the present invention. Referring to FIG. 3, the system, contrast to the conventional ISET system in FIG. 1, includes a user interface 301, DFD 302 and SC 303 tools which are diagramming tools, repository generator 304, repository searcher 305, repository service interface 306, repository 307, database interface 308 and CASE repository 309.

DFD and SC tools 302 and 303 perform structured analysis and design of software development through integrated user interface 301. Here, to consistently store all information generated into CASE repository 309, the following procedure is used. First, all information inputted is transmitted to repository service interface 306 which is command and syntactic analyzing processor. Then, searching is carried out for repository 307 to check there is consistency and integrity in the contents of repository defined as integrated CASE meta model. Thereafter, the information is stored by database interface 308 which provides a data approach means.

Figure 4:
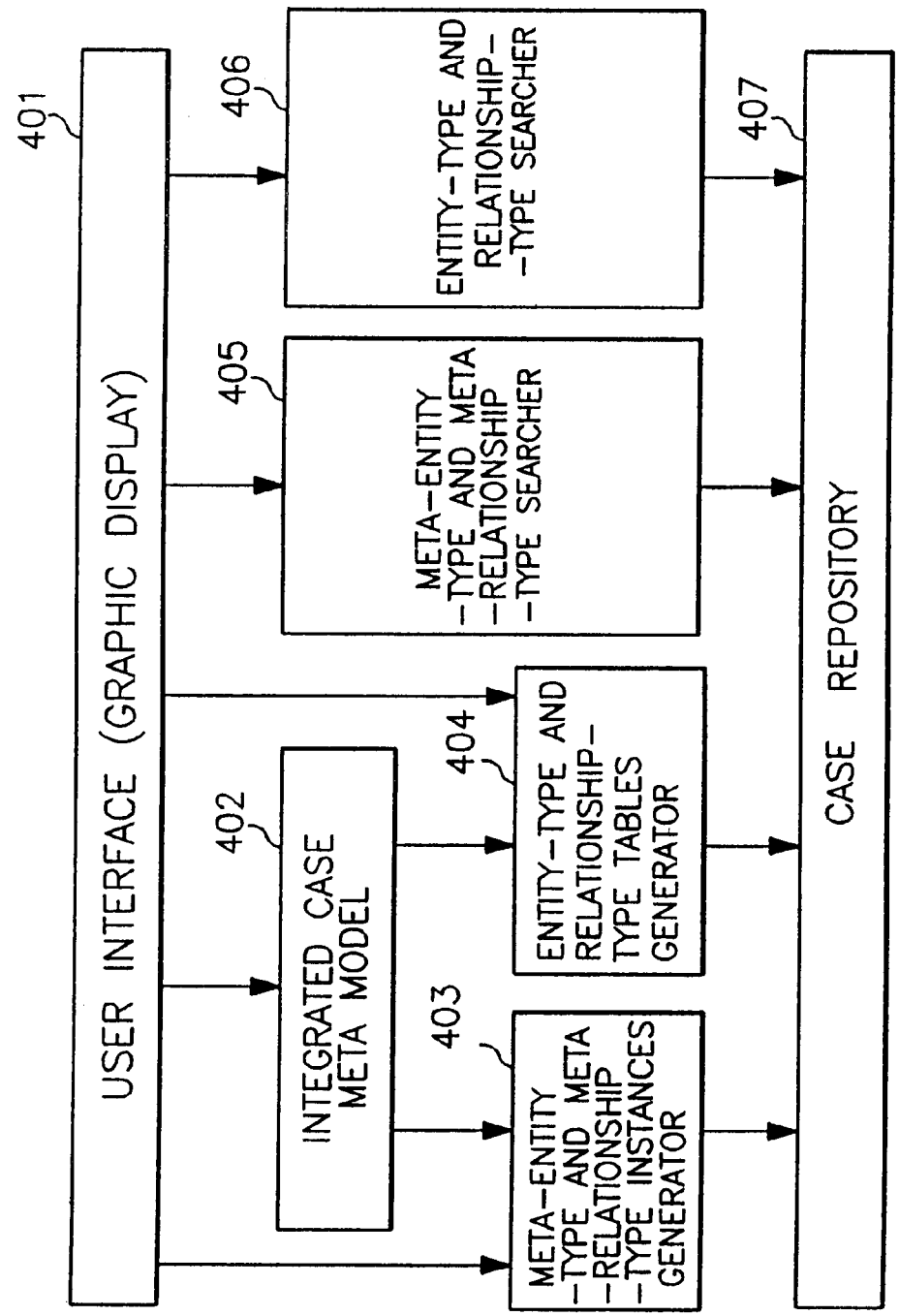
FIG. 4 shows a architecture of an abstracting system of the integrated CASE repository for processes according to the present invention.

FIG. 4 shows a architecture of the integrated CASE repository system for process methodology according to the present invention. The system includes: a user interface 401 connected for searching for information of the integrated CASE meta model, to be stored in CASE repository; an integrated CASE meta model 402, connected to user interface 401, for representing directional relationships between entities to define consistent relationships between tools; a meta-entity-type and meta-relationship-type instances generator 403, connected to user interface 401, for generating an instance of meta-entity-type and meta-relationship-type from integrated CASE meta model 402; an entity-type and relationship-type tables generator 404, connected to user interface 401, for generating a table of entity type and relationship type from integrated CASE meta model 402; a meta-entity-type and meta-relationship-type searcher 405, connected to user interface 401, for searching for meta-entity-type and meta-relationship-type; an entity-type and relationship-type searcher 406, connected to user interface 401, for searching for entity types and relationship types; and CASE repository 407, connected to meta-entity-type and meta-relationship-type instances generator 403, entity-type and relationship-type tables generator 404, meta-entity-type and meta-relationship-type searcher 405 and entity-type and relationship-type searcher 406, for storing information of integrated CASE meta model using ER model.

Figure 5:
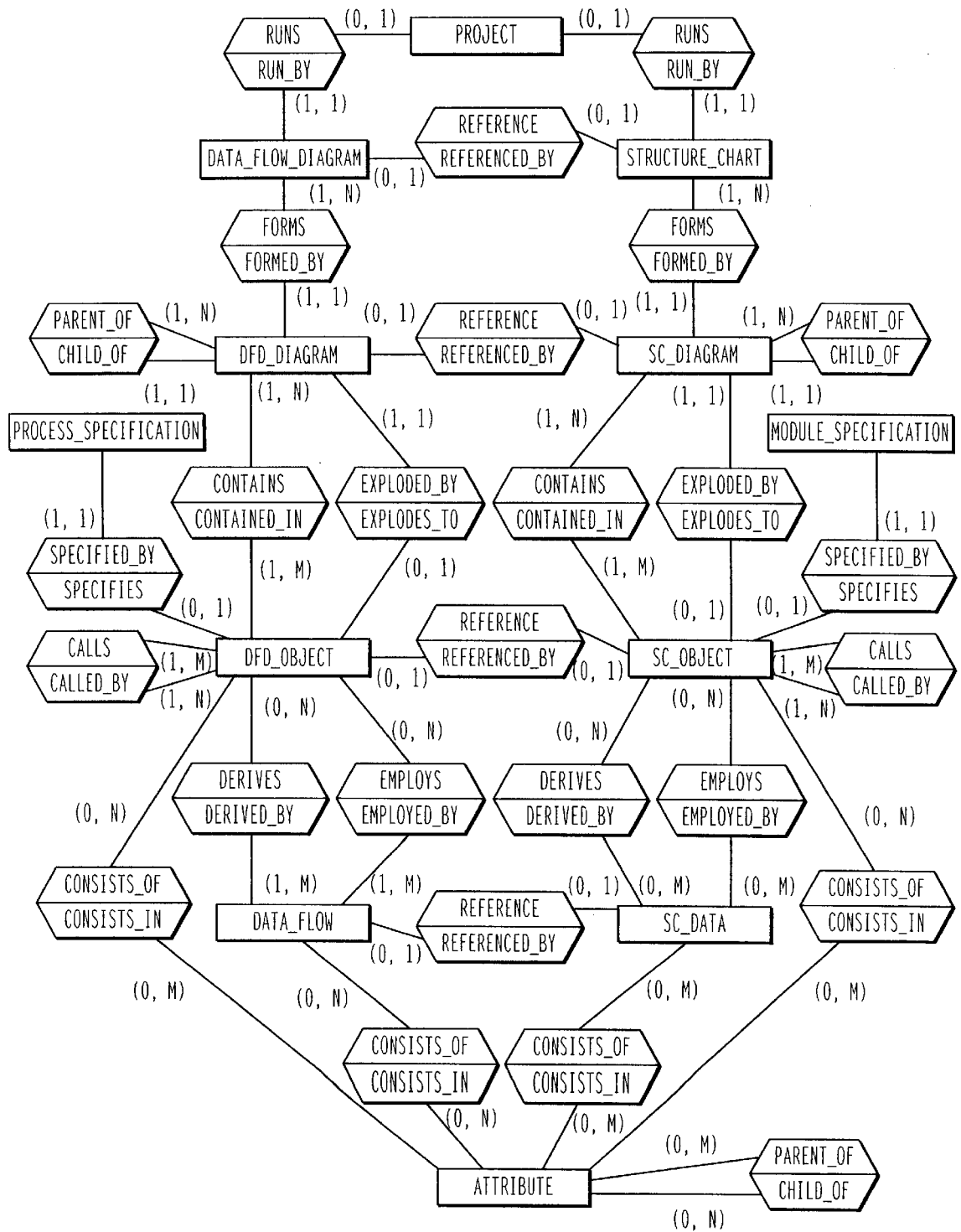
FIG. 5 shows an integrated CASE meta model for processes using ER model of a conceptual modeling technique.

CASE repository 407 stores logical data structures of FIGS. 6A to 6D, which represent integrated CASE meta model of FIG. 5 as conceptual data structures, and the contents of table of FIG. 7. Using this integrated CASE meta model, detection of consistency in the type and meaning of information used by each tool is performed by logical data structures of FIGS. 6A to 6D, composed of three tables, and all information generated by each tool is stored in the physical data structure of FIG. 7, composed of three tables.

The table structures of FIGS. 6A to 6D, for carrying out the consistency detection, includes a meta-entity-type-meta-attribute-type table storing information of a meta-attribute of a meta-entity, a meta-entity-type-meta-attribute-group-type table storing information of a meta-attribute-group of a meta-entity, and a meta-relationship-type-meta-attribute-type table storing information of a meta-attribute of a meta-relationship. The table structure of FIG. 7, for the repository, includes an entity-type-attribute-type table storing information of an attribute of an entity, an entity-type-attribute-group-type table storing information of an attribute group of an entity, and a relationship-type-attribute-type table storing information of an attribute of a relationship.

A method of describing ER model of conceptual modeling technique of the integrated CASE model is explained below with reference to FIG. 5. Entities and relationships are respectively represented as tetragons and hexagons, and cardinality is represented as the minimum value of 0 or 1, and the maximum value of 1 or M (or N(many)). The hexagon is bisected to represent directional call association between two entities or of an entity itself. The cardinality of relationship, represented as (i,j) on the relationship, has the following meanings.

When cardinality is "i=0", it represents that the existences of all occurrence in one entity do not entirely depend on the occurrence of other entity through relationship. When "i=1", it represents that the existences completely depend on the occurrence of other entity. That is, it means there is existent dependence relationship. When the maximum cardinality is "j=1", it represents that, for the number of occurrence of relationship, in which each occurrence in one entity can participate, only one occurrence can be related. In case of cardinality of j=M(N), multiple occurrences can be related for the number of occurrence of relationship in which each generation in one entity can participate.

In FIG. 5, for example, relationship "FORMS" between entities "DATA_FLOW_DIAGRAM" and "DFD_DIAGRAM" means that only "DATA_FLOW_DIAGRAM" must actively construct multiple entities "DFD_DIAGRAMs". On the contrary, relationship "FORMED_BY" means that multiple entities "DFD_DIAGRAMs" must be passively constructed of only one entity "DATA_FLOW_DIAGRAM". FIG. 5 shows the integrated CASE meta model for processes using ER model of conceptual modeling technique. The integrated CASE meta model is defined as entity and the directional relationship between entities according to the type and meaning of information of the components of DFD tool (DFD_group) and SC tool (SC_group), with entity "PROJECT" in the center. In FIG. 5, entity "PROJECT" has an association with entities "DATA_FLOW_DIAGRAM" and "STRUCTURE_CHART" through relationship "RUNS". Entity "DATA_FLOW_DIAGRAM" has an association to multiple entities "DFD_DIAGRAMs" by relationship "FORMS". Similarly, entity "STRUCTURE_CHART" has an association to multiple entities "SC_DIAGRAMs" through relationship "FORMS".

By representing these directional relationships, it is possible to automatically integratedly manage the detection of consistency between the entities and standardization of software development process. Information commonly used in the tools is extracted to define entity "ATTRIBUTE", allowing sharing of information between the tools to be performed. Generating information is referable modelled with the relationships between entities of the tools, that is, relationships between entities "DATA_FLOW_DIAGRAM" and "STRUCTURE_CHART", entities "DFD_DIAGRAM" and "SC_DIAGRAM", entities "DFD_OBJECT" and "SC_OBJECT", and entities "DATA_FLOW" and "SC_DATA". This accomplishes full automation of software development process.

In the integrated CASE meta models for extracting an entity type and relationship type of FIG. 5, entities which can be divided into two or more child entities, and directional relationships between them are subdivided according to the type and meaning of information. In FIG. 5, the entities which can be divided into child entities are described below.

Entity "DFD_DIAGRAM" is composed of child entities "DFD_CONTEXT_DIAGRAM" and "DFD_OTHER_DIAGRAM". Entity "DFD_OBJECT" is composed of child entities "EXTERNAL_ENTITY", "PROCESS", "DATA_STORE" and "EXTERNAL_ENTITY". Entity "SCD_DIAGRAM" is composed of child entities "SCD_ROOT_DIAGRAM", and "SCD_OTHER_DIAGRAM". Entity "SC_OBJECT" is composed of child entities "ROOT_MODULE", "STANDARD_MODULE", "LIBRARY_MODULE", "TRANSACTION_MODULE". "DATA-BASE" and "CONNECTOR". Entity "SC_DATA" is composed of child entities "DATA_COUPLE" and "CONTROL_FLAG". Entity "ATTRIBUTE" is composed of child entities "COMPOSITE_ATTRIBUTE" and "SINGLE_ATTRIBUTE".

As shown in FIGS. 6A to 6D, the logical data structures to store the information of the meta entities in CASE repository are composed of entity types, relationship types, attribute group types and attribute type, for the meta entities of FIG. 5. Characteristic meta-entity numbers META-ENTITY-IDs are given to the meta entities according to the order of definition of information to be stored. Meta entity information of FIG. 6A is a logical data structure representing which meta-attribute-group-type and meta-attribute-type does a meta-entity-type include. For example, CASE repository stores a logical data structure in which meta-entity-type "PROJECT" has meta entity number of 178, no meta-attribute-group-type, and meta-attribute-type "ENTITY_NAME", "AUTHOR_NAME", "START_NAME" and "DESCRIPTION".

Data structure of FIG. 6B represents which meta-attribute-type does a meta-relationship-type includes, data structure of FIG. 6C shows which format and minimum/maximum lengths is a meta-attribute-type defined as, and data structure of FIG. 6D represents which two meta-attribute-type do a meta-attribute-group-type include. As shown in FIG. 7, the physical data structure, which stores information of the meta data in CASE repository, has information including an entity-type-attribute-type table, entity-type-attribute-group-type table, and relationship-type-attribute-type table. Each table is composed of attributes of meta data, according to the definition of meta entity.

The integrated CASE meta model includes rules and constraints for information, which each tool must have. The meta model of repository, to be stored in CASE repository, performs detection of consistency for the type and meaning of information using information generated by the integrated CASE meta model, and it becomes the storage structure for all information generated by each tool. The meta entities and meta data of the repository define a kind of relational database schema, and are stored in the relational database, to variously search and inquire for information of the meta entities and meta data according to the user interface.

Figure 8A:
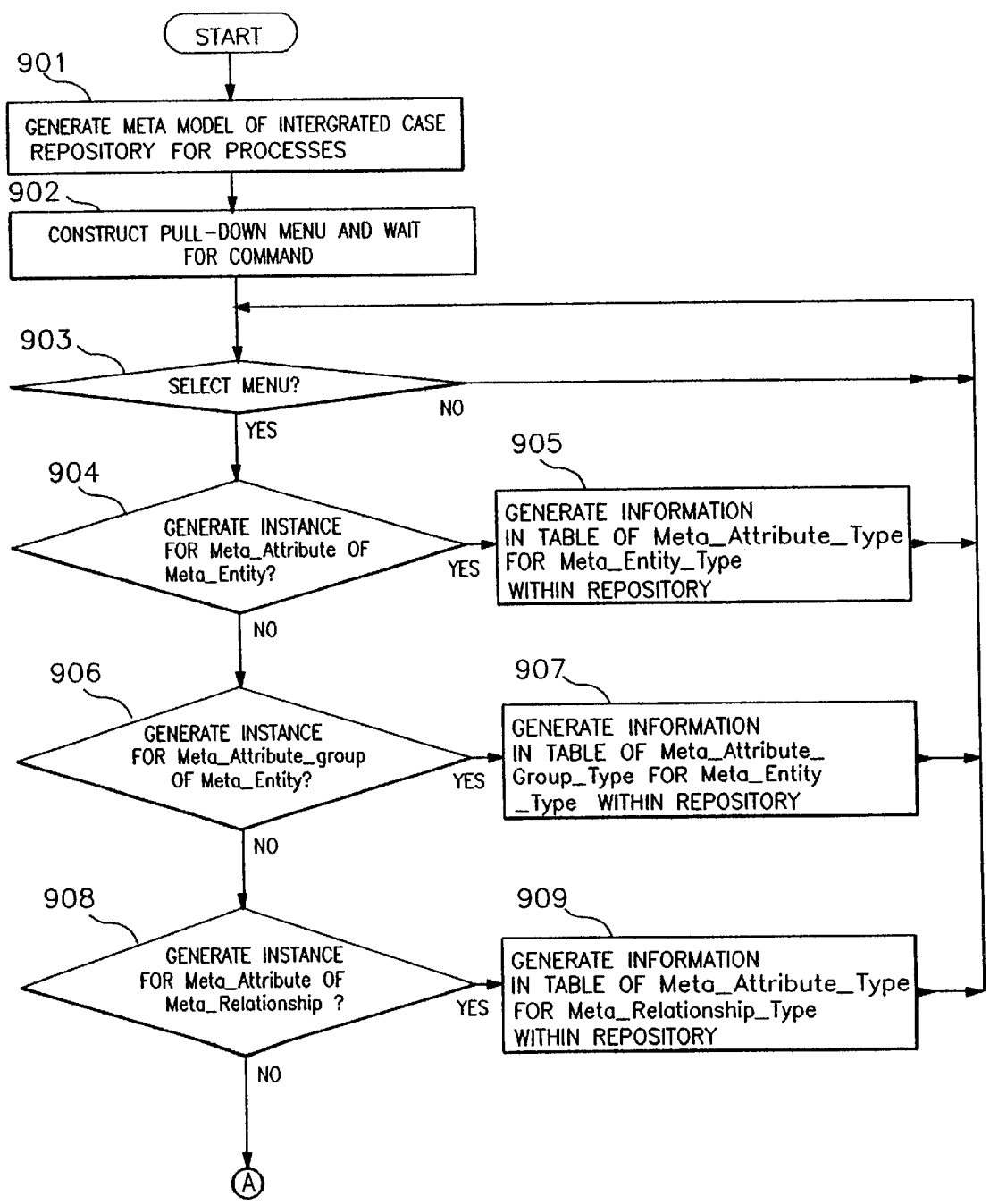
FIGS. 8A and 8B show flow diagrams of process performed in the system according to the present invention.
Figure 8B:
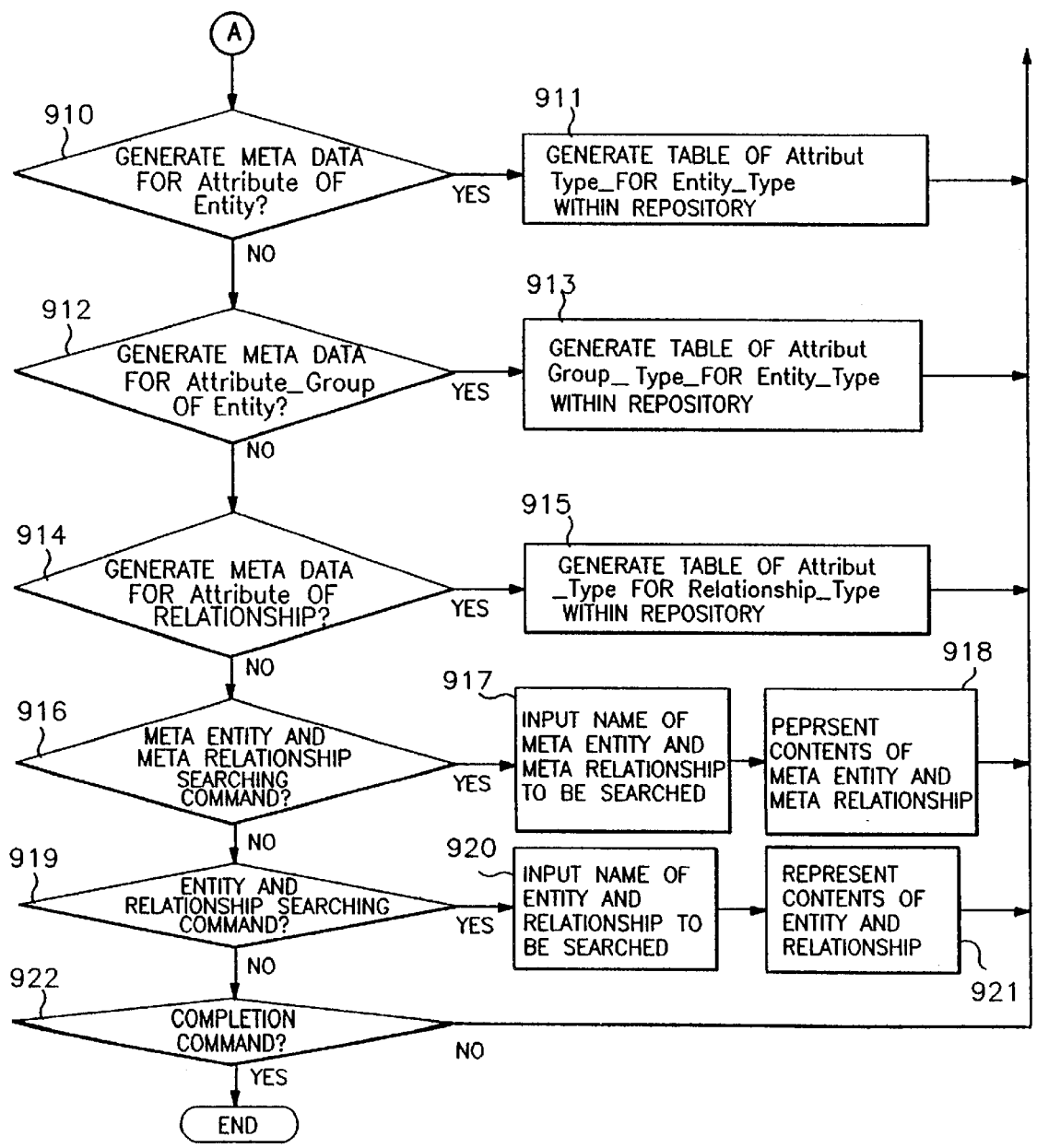

FIGS. 8A and 8B are flow diagrams of process performed in the system to which the present invention is executed. First of all, meta model of the integrated CASE repository for processes is generated (901), pull-down menu is constructed (902) and a command is received (903) to process a corresponding step. The first step 904 and 905 creates information in the meta-entity-type-meta-attribute-type table of the repository using the meta model when the command corresponds to generation of instance for a meta-attribute of meta-entity. The second step 906 and 907 generates information in the meta-entity-type-meta-attribute-group-type table of the repository using the meta model when the command corresponds to generation of instance for a meta-attribute-group of meta-entity. The third step 908 and 909 creates information in the meta-relationship-type-meta-attribute-type table of the repository using the meta model when the command is generation of instance for a meta-attribute of meta-relationship.

The fourth step 910 and 911 creates the entity-type-attribute-type table in the repository using the meta model when the command is generation of meta data for an attribute of entity. The fifth step 912 and 913 creates the entity-type-attribute-group-type table in the repository using the meta model when the command corresponds to generation of meta data for an attribute group of entity, and sixth step 914 and 915 creates the relationship-type-attribute-type table in the repository using the meta model when the command is generation of meta data for an attribute of relationship.

The seventh step 916, 917 and 918 searches for meta entities and meta relationships to represent their contents when meta-entity and meta-relationship searching command, and eighth step 919, 920 and 921 searches for entities and relationships to show their contents when entity and relationship searching command. Finally, the ninth step 922 completes the process when completion command, and, if not, waits for the next command.

The integrated CASE tool must include various tools of DFD tool, SC tool, repository searcher, and repository generator. Especially, the repository is an essential component for consistently storing, sharing and managing information generated by DFD and SC tools, diagramming tools. The repository automatically integratedly manages information of requirement analysis and design for structured techniques supporting software development process, to previously control repeated information or inconsistent information. Furthermore, the repository allows one tool to use information generated by other tool, to bring about systematic coupling of the tools supporting software development life cycle, resulting in standardization and full automation of the software development process.

As described above, the present invention provides a method of storing, sharing and managing information dealt and generated by various tools. The present invention constructs the repository for commonly storing, sharing and managing information generated by CASE tools of DFD and SC of process methodologies, to automatically integratedly manage the information, thereby accomplishing standardization and full automation of software development process, and sharing of information between the tools.

It will be apparent to those skilled in the art that various modifications and variations can be made in the integrated CASE repository meta model system for process methodology and integrated supporting method of the present invention without departing from the spirit or scope of the invention. Thus, it is intended that the present invention cover the modifications and variations of this invention provided they come within the scope of the appended claims and their equivalents.

What is claimed is:

1. An integrated CASE repository meta model system for process methodology, comprising:
    a user interface connected to search for information of integrated CASE meta model, to be stored in CASE repository;
    an integrated CASE meta model, connected to the user interface, modelled as entities and directional relationships according to the type and meaning of information of components of an integrated CASE tool for processes, using an entity-relationship model of conceptual modeling technique;
    a meta-entity-type and meta-relationship-type instances generator, connected to the user interface, for generating meta-entity-type and meta-relationship-type instances from the integrated CASE meta model;
    an entity-type and relationship-type tables generator, connected to the user interface, for generating entity-type and relationship-type tables from the integrated CASE meta model;
    a meta-entity-type and meta-relationship-type searcher, connected to the user interface, for searching for meta-entity-type and meta-relationship-type;
    an entity-type and relationship-type searcher, connected to the user interface, for searching for entity-type and relationship-type; and
    a CASE repository for storing information of the integrated CASE meta model using the entity-relationship model, the CASE repository being connected to the meta-entity-type and meta-relationship-type instances generator, entity-type and relationship-type tables generator, meta-entity-type and meta-relationship-type searcher and entity-type and relationship-type searcher.

2. The system as claimed in claim 1, wherein the integrated CASE meta model includes rules and constraints for information, which each tool must have, performs consistency detection for the type and meaning of information generated when the information is stored in the CASE repository, and is composed of meta model of information storage which becomes a storage structure for all information generated by each tool.

3. The system as claimed in claim 2, wherein a logical data structure for the consistency detection includes entity-type, relationship-type, attribute-group-type, attribute-type, for meta entities, and characteristic meta entity number is given to each meta-entity according to the order of definition of information to be stored.

4. The system as claimed in claim 2, wherein a logical data structure for storing meta data information in CASE repository includes entity-type-attribute-type tables, entity-type-attribute-group-type tables, and relationship-type-attribute-type tables, and each table is composed of attributes of meta data according to the definition of meta-entity.

5. The system as claimed in claim 1, wherein the logical structure of the repository defines a kind of relational database schema, and is constructed to be stored in the relational database to perform various inquiry for information searching.

6. An integrated supporting method applied to an integrated CASE repository meta model system for process methodology, the method comprising:
    a first step of generating meta model of integrated CASE repository for processes, constructing pull-down menu, receiving a command, and waiting for a corresponding command;
    a second step of generating information in a meta-entity-type of meta-attribute-type table of the repository using the meta model, when the command is the generation of instance for a meta-attribute of meta-entity, after the first step is performed;
    a third step of generating information in a meta-entity-type of meta-attribute-group-type table of the repository using the meta model, when the command is the generation of instance for a meta-attribute-group of meta-entity, after the first step;
    a fourth step of generating information in a meta-relationship-type of meta-attribute-type table of the repository using the meta model when the command is the generation of instance for a meta-attribute of meta-relationship, after the first step;
    a fifth step of generating an entity-type of attribute-type table in the repository using the meta model when the command is generation of meta data for an attribute of entity, after the first step;
    a sixth step of generating an entity-type of attribute-group-type table using the meta model when the command is generation of meta data for an attribute-group of entity, after the first step;
    a seventh step of generating a relationship-type of attribute-type table in the repository using the meta model when the command is generation of meta data for an attribute of relationship, after the first step;

an eighth step of searching for meta entities and meta relationships, to represent the contents of meta entities and meta relationships, when meta-entity and meta-relationship searching command, after the first step;

a ninth step of searching for entities and relationships, to represent the contents of the entities and relationships when entity and relationship searching command, after the first step; and a tenth step of completing the process when completion command, and, if not, waiting for the next command.

* * * * *